US012033308B2

(12) United States Patent
Zhou et al.

(10) Patent No.: US 12,033,308 B2
(45) Date of Patent: Jul. 9, 2024

(54) IMAGE CORRECTION METHOD AND APPARATUS FOR CAMERA

(71) Applicant: Beijing Tsingmicro Intelligent Technology Co., Ltd., Beijing (CN)

(72) Inventors: Kai Zhou, Beijing (CN); Shouyi Yin, Beijing (CN); Shibin Tang, Beijing (CN); Peng Ouyang, Beijing (CN); Xiudong Li, Beijing (CN); Bo Wang, Beijing (CN)

(73) Assignee: BEIJING TSINGMICRO INTELLIGENT TECHNOLOGY CO., LTD., Beijing (CN)

( * ) Notice: Subject to any disclaimer, the term of this patent is extended or adjusted under 35 U.S.C. 154(b) by 365 days.

(21) Appl. No.: 17/488,502

(22) Filed: Sep. 29, 2021

(65) Prior Publication Data

US 2022/0036521 A1    Feb. 3, 2022

Related U.S. Application Data

(63) Continuation of application No. PCT/CN2021/087040, filed on Apr. 13, 2021.

(30) Foreign Application Priority Data

Apr. 16, 2020  (CN) .......................... 202010298041.9

(51) Int. Cl.
*G06T 5/80*     (2024.01)
*G06T 5/50*     (2006.01)
(52) U.S. Cl.
CPC ................. *G06T 5/80* (2024.01); *G06T 5/50* (2013.01); *G06T 2207/20221* (2013.01)

(58) Field of Classification Search
CPC . G06T 5/006; G06T 5/50; G06T 2207/20221; G06T 2207/30244;
(Continued)

(56) References Cited

FOREIGN PATENT DOCUMENTS

| CN | 103868524 | 6/2014 |
| CN | 111540004 A | 8/2020 |

OTHER PUBLICATIONS

CN103868524B Tang et al., 2014, Google translated (Year: 2014).*
(Continued)

*Primary Examiner* — Jianxun Yang
(74) *Attorney, Agent, or Firm* — Hodgson Russ LLP

(57) ABSTRACT

An image correction method includes: capturing speckle patterns on two planes at different distances to obtain a first image of speckle projected on a first plane and a second image of speckle projected on a second plane; matching the first image with the second image to obtain sub-pixel matching points; obtaining, based on first physical coordinates of the sub-pixel matching points on the first image and second physical coordinates of the sub-pixel matching points on the second image, a mapping matrix between the first and second physical coordinates; obtaining a direction vector of a center of the speckle projector in a camera reference frame according to the mapping matrix; adjusting coordinate axis directions of the camera reference frame to align a horizontal axis direction with the direction vector, updating an imaging matrix of the camera; and mapping a target scene image through the imaging matrix to obtain a corrected image.

15 Claims, 5 Drawing Sheets

(58) Field of Classification Search
CPC ........... G06T 7/521; G06T 7/80; G06T 7/593;
G06T 2207/10028; Y02T 10/40
See application file for complete search history.

(56) References Cited

OTHER PUBLICATIONS

CN106651794B Liu et al., 2019, Google translated (Year: 2019).*
Hu, "Research on three-dimensional vision measurement system of monocular structured light," Information Technology Series of Full-text Database of Chinese Excellent Master's Degree Thesis, No. 7, Jul. 2018.
WIPO, International Search Report and Written Opinion for PCT/CN2021/087040, Jul. 16, 2021.

* cited by examiner

IMAGE CORRECTION METHOD AND APPARATUS FOR CAMERA

CROSS-REFERENCE TO RELATED APPLICATIONS

This application is a continuation of International Application No. PCT/CN2021/087040, filed Apr. 13, 2021, which claims priority to and benefits of Chinese Patent Application No. 2020102980419, filed on Apr. 16, 2020, the entire contents of which are incorporated by reference herein.

FIELD

The present disclosure relates to the field of image processing, and more particularly to an image correction method and apparatus for a camera.

BACKGROUND

Depth map estimation is an important research direction in the field of stereo vision research, which is widely used in the fields of intelligent security, autonomous driving, human-machine interaction, mobile payment and the like. Depending on the equipment used, the existing depth map estimation methods mainly include a binocular camera method, a combined method of structured lights with a binocular camera, a combined method of structured lights with a monocular camera, and a time of flight (TOF) method. Besides that, a method based on speckle structured light projection and in combination with the monocular camera has been widely used due to its simple structure, lower costs and power consumption, and higher accuracy.

The method based on the speckle structured light projection and in combination with the monocular camera uses a speckle projector to project a fine speckle pattern onto a surface of a scene object, and at the same time, a pre-calibrated camera is used to capture an image of the object with the speckle pattern, and then the image is matched with a pre-stored reference image, and finally the depth map of the scene is computed based on the matched pixels and the calibration parameters of the camera. In order to ensure the simplicity of the algorithm and the matching accuracy, the equipment based on this method generally needs to meet the following requirements in structure: the camera and the speckle projector are arranged in parallel and in the same orientation, and a straight line connecting an optical center of the camera with a center of the projector is parallel to an X-axis of the camera reference system. However, in actual applications, due to the installation error in the relative position of the camera and the speckle projector, it is difficult to strictly meet the above requirements, which leads to the results of depth map estimation less accurate.

SUMMARY

Embodiments of a first aspect of the present disclosure provide an image correction method for a camera. The method includes: capturing speckle patterns on two planes at different distances by a camera to obtain a first image of speckle projected on a first plane and a second image of speckle projected on a second plane, the speckle patterns being projected by a speckle projector, and the camera and the speckle projector having the same orientation and fixed relative positions; matching the first image with the second image by an image matching algorithm to obtain sub-pixel matching points; obtaining, based on first physical coordinates of the sub-pixel matching points on the first image and second physical coordinates of the sub-pixel matching points on the second image, a mapping matrix between the first physical coordinates and the second physical coordinates; obtaining a direction vector of a center of the speckle projector in a camera reference frame according to the mapping matrix; adjusting coordinate axis directions of the camera reference frame to align a horizontal axis direction with the direction vector, and updating an imaging matrix of the camera; and mapping a target scene image through the imaging matrix to obtain a corrected image.

In some embodiments of the present disclosure, the method further includes: performing computations based on pixel coordinates of the sub-pixel matching points by internal parameter conversion to obtain the first physical coordinates of the sub-pixel matching points on the first image and the second physical coordinates of the sub-pixel matching points on the second image.

In some embodiments of the present disclosure, the obtaining, based on first physical coordinates of the sub-pixel matching points on the first image and second physical coordinates of the sub-pixel matching points on the second image, a mapping matrix between the first physical coordinates and the second physical coordinates includes: computing the mapping matrix according to a following formula:

$$\begin{bmatrix} u'_i \\ v'_i \\ 1 \end{bmatrix} = H \begin{bmatrix} u_i \\ v_i \\ 1 \end{bmatrix}, (i = 1, 2, \ldots, n);$$

where $(u_i, v_i)^T$ represents the first physical coordinates, and $(u'_i, v'_i)^T$ represents the second physical coordinates;
the mapping matrix is expressed as:

$$H = I + (\mu - 1)\frac{va^T}{v^T a};$$

where H represents the mapping matrix, I represents a 3×3 unit matrix, μ represents a scalar, v represents a homogeneous coordinate of a projecting position of the center of the speckle projector on the camera and the direction vector of the center of the speckle projector in the camera reference frame; and a is a homogeneous representation of another two-dimensional vector.

In some embodiments of the present disclosure, the mapping a target scene image through the imaging matrix to obtain a corrected image includes: computing grayscales of sub-pixel points on the target scene image by interpolation, and assigning the grayscales to respective pixel points on the corrected image.

Embodiments of a second aspect of the present disclosure provide an image correction apparatus. The image correction apparatus includes: an image collector, a matcher, an acquiring component, a computing component, an analyzing component, and a processor.

The image collector is configured to capture speckle patterns on two planes at different distances to obtain a first image of speckle projected on a first plane and a second image of speckle projected on a second plane. The speckle patterns are projected by a speckle projector, and the image collector and the speckle projector have the same orientation and fixed relative positions.

The matcher is configured to match the first image with the second image by an image matching algorithm to obtain sub-pixel matching points.

The acquiring component is configured to obtain, based on first physical coordinates of the sub-pixel matching points on the first image and second physical coordinates of the sub-pixel matching points on the second image, a mapping matrix between the first physical coordinates and the second physical coordinates.

The computing component is configured to obtain a direction vector of a center of the speckle projector in a camera reference frame according to the mapping matrix.

The analyzing component is configured to adjust coordinate axis directions of the camera reference frame to align a horizontal axis direction with the direction vector, and update an imaging matrix of the image collector.

The processor is configured to map a target scene image through the imaging matrix to obtain a corrected image.

In some embodiments of the present disclosure, the acquiring component is further configured to: perform computations based on pixel coordinates of the sub-pixel matching points by internal parameter conversion to obtain the first physical coordinates of the sub-pixel matching points on the first image and the second physical coordinates of the sub-pixel matching points on the second image.

In some embodiments of the present disclosure, the acquiring component is configured to: compute the mapping matrix according to a following formula:

$$\begin{bmatrix} u'_i \\ v'_i \\ 1 \end{bmatrix} = H \begin{bmatrix} u_i \\ v_i \\ 1 \end{bmatrix}, (i = 1, 2, \ldots, n);$$

where $(u_i, v_i)^T$ represents the first physical coordinates, and $(u'_i, v'_i)^T$ represents the second physical coordinates. The mapping matrix is expressed as:

$$H = I + (\mu - 1)\frac{va^T}{v^T a};$$

where H represents the mapping matrix, I represents a 3×3 unit matrix, $\mu$ represents a scalar, v represents a homogeneous coordinate of a projecting position of the center of the speckle projector on the image collector and the direction vector of the center of the speckle projector in the camera reference frame; and a is a homogeneous representation of another two-dimensional vector.

In some embodiments of the present disclosure, the processor is configured to compute grayscales of sub-pixel points on the target scene image by interpolation, and assign the grayscales to respective pixel points on the corrected image.

Embodiments of a third aspect of the present disclosure provide an electronic device. The electronic device includes: a memory; a processor; and computer programs stored in the memory and executable by the processor. The computer programs that, when executed by the processor, cause the image correction method as described in embodiments of the first aspect of the present disclosure to be performed.

Embodiments of a fourth aspect of the present disclosure provide a computer-readable storage medium having stored therein computer programs that execute the image correction method as described in embodiments of the first aspect of the present disclosure.

BRIEF DESCRIPTION OF THE DRAWINGS

The accompanying drawings described herein are intended to provide a further understanding of the present disclosure, which constitute a part of the present disclosure, but shall not be construed to limit the present disclosure. These and other aspects and advantages of embodiments of the present disclosure will become apparent and more readily appreciated from the following descriptions made with reference to the drawings, in which.

DETAILED DESCRIPTION

Embodiments of the present disclosure will be described in detail below with reference to accompanying drawings and examples of the present disclosure. The embodiments described herein with reference to drawings are explanatory, illustrative, and used to generally understand the present disclosure. The embodiments shall not be construed to limit the present disclosure. It should be noted that the embodiments or examples as well as the technical features described therein can be appropriately combined with each other without conflicts, and the embodiments or examples obtained thereby also fall within the protect scope of the present disclosure.

In addition, the operations as illustrated in the flowcharts of the accompanying drawings may be performed through such as a set of computer-executable instructions in a computer system. It should be noted that although the operations are illustrated in a certain logical order as shown in the flowcharts, these operations in some cases can also be performed in a different order.

Embodiments of the present disclosure provide an image correction method and apparatus for a camera, which meet the requirements of high precision with simple structure, low costs and low power consumption.

Figure 1:
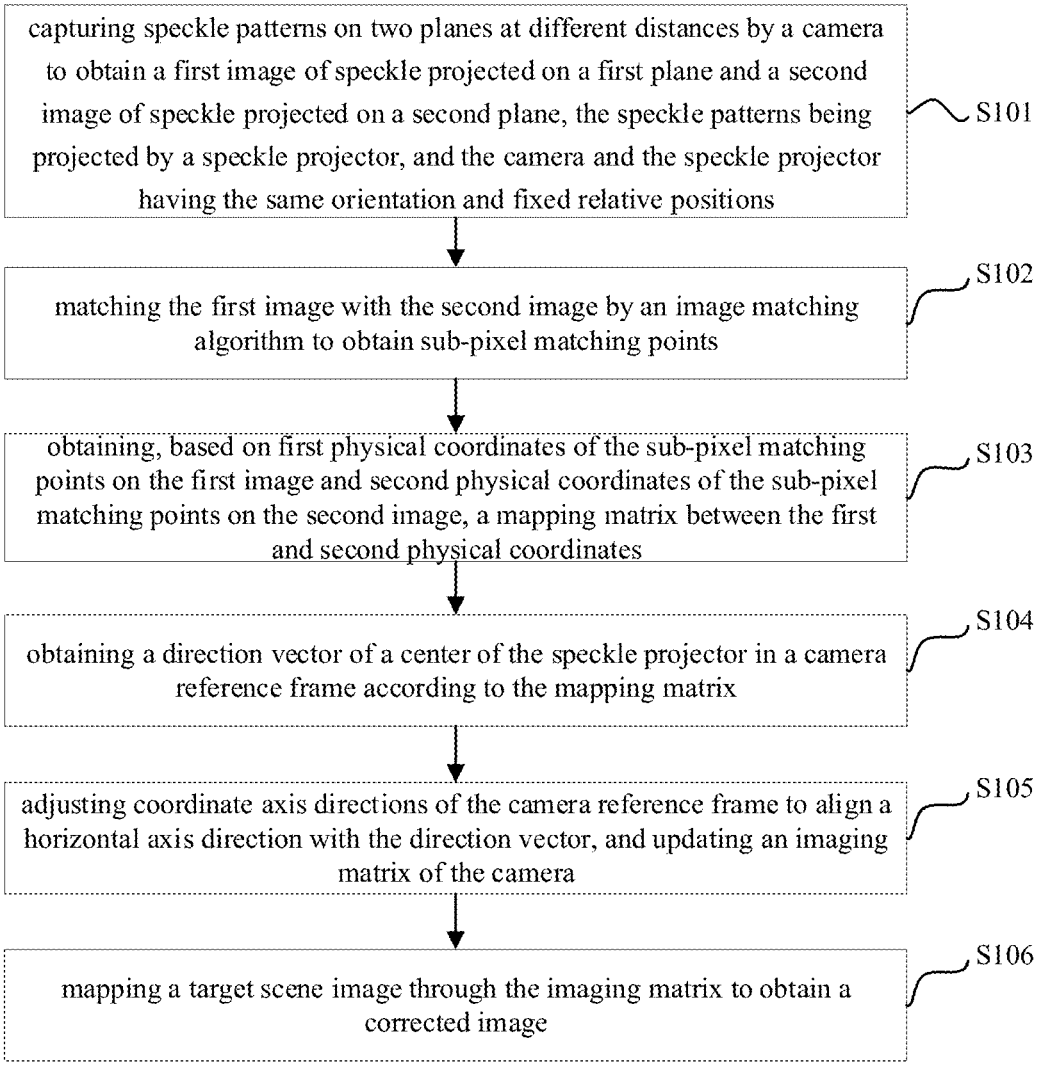
FIG. 1 is a schematic flowchart of an image correction method for a camera according to embodiments of the present disclosure.

With reference to FIG. 1, the present disclosure provides in embodiments an image correction method for a camera. The method includes the following operations as illustrated in blocks of FIG. 1.

At block S101, speckle patterns on two planes at different distances are captured by a camera to obtain a first image of speckle projected on a first plane and a second image of speckle projected on a second plane, the speckle patterns are projected by a speckle projector, and the camera and the speckle projector have the same orientation and fixed relative positions.

At block S102, the first image is matched with the second image by an image matching algorithm to obtain sub-pixel matching points.

At block S103, based on first physical coordinates of the sub-pixel matching points on the first image and second physical coordinates of the sub-pixel matching points on the second image, a mapping matrix between the first physical coordinates and the second physical coordinates is obtained.

At block S104, a direction vector of a center of the speckle projector in a camera reference frame is obtained according to the mapping matrix.

At block S105, coordinate axis directions of the camera reference frame are adjusted to align a horizontal axis direction with the direction vector, and an imaging matrix of the camera is updated.

At block S106, a target scene image is mapped through the imaging matrix to obtain a corrected image.

In embodiments of the present disclosure, two flat plates are used to cover all fields of view of the camera, such that the captured first image and second image contain more speckle elements, which makes the subsequent computational result more accurate. It will be appreciated that depending on different actual demands, flat plates smaller than the field of view of the camera may also be adopted, as long as ensuring that both the first image and the second image contain speckles (on the flat plates), which can be selected by those skilled in the related art as required, and thus will not be particularly limited in the present disclosure.

In some embodiments of the present disclosure, it is possible to use only one camera and only one speckle projector, the camera and the speckle projector have the same orientation, and their relative positions are fixed.

In the method according to some embodiments of the present disclosure, a white flat plate may be placed directly in front of the camera and the speckle projector, the speckle pattern is projected onto the white flat plate by the speckle projector, and the flat plate image is captured by the camera. In some examples, by placing the flat plate at two different distances directly in front of the camera and the speckle projector, and using the camera to capture images separately, two flat plate images containing speckles, i.e., the first image and the second image, can be obtained.

In some embodiments of the present disclosure, the method further includes: performing computations based on pixel coordinates of the sub-pixel matching points by internal parameter conversion to obtain the first physical coordinates of the sub-pixel matching points on the first image and the second physical coordinates of the sub-pixel matching points on the second image. According to the first physical coordinates and the second physical coordinates, the mapping matrix between the first physical coordinates on the first image and the second physical coordinates on the second image can be computed by projective geometry. For example, the mapping matrix may be computed according to the following formula:

$$\begin{bmatrix} u'_i \\ v'_i \\ 1 \end{bmatrix} = H \begin{bmatrix} u_i \\ v_i \\ 1 \end{bmatrix}, (i = 1, 2, \ldots, n);$$

where $(u_i, v_i)^T$ represents the first physical coordinates, and $(u'_i, v'_i)^T$ represents the second physical coordinates.

The mapping matrix may be expressed as:

$$H = I + (\mu - 1)\frac{va^T}{v^T a};$$

where H represents the mapping matrix, I represents a 3×3 unit matrix, µ represents a scalar, v represents a homogeneous coordinate of a projecting position of the center of the speckle projector on the camera and the direction vector of the center of the speckle projector in the camera reference frame; and a is a homogeneous representation of another two-dimensional vector.

In some embodiments of the present disclosure, the mapping the target scene image through the imaging matrix to obtain the corrected image incudes: computing grayscales of sub-pixel points on the target scene image by interpolation, and assigning the grayscales to respective pixel points on the corrected image. In this way, the method of the present disclosure is capable of improving the accuracy of the image.

In order to illustrate the image correction method for the camera as provided in the present disclosure more clearly, reference will be made below to specific examples. It will be appreciated to those skilled in the art that the examples described below are only some combined implementations for ease understanding of the above method, and shall not be construed as a limitation.

Figure 2:
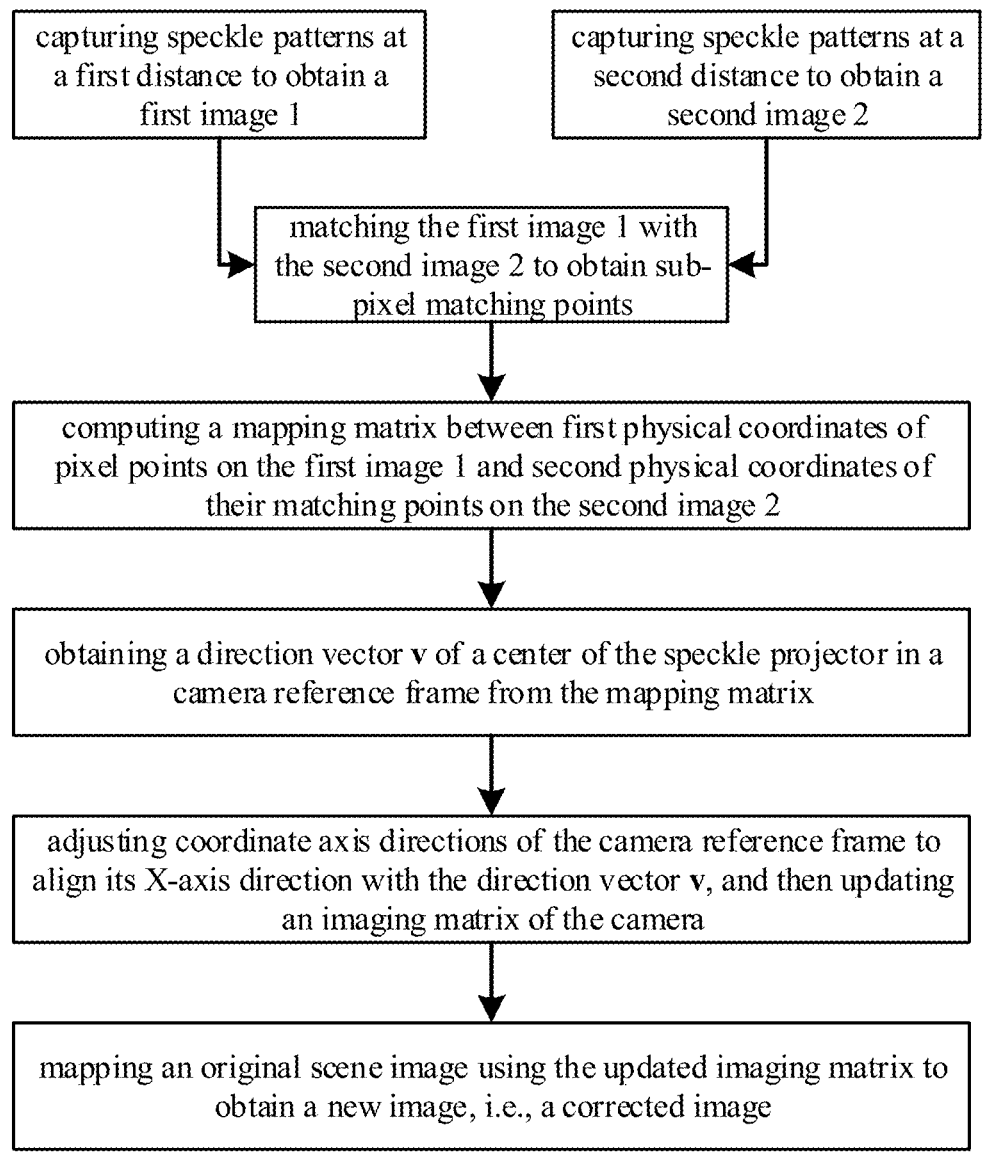
FIG. 2 is a schematic flowchart of an image correction method for a camera according to embodiments of the present disclosure.
Figure 3:
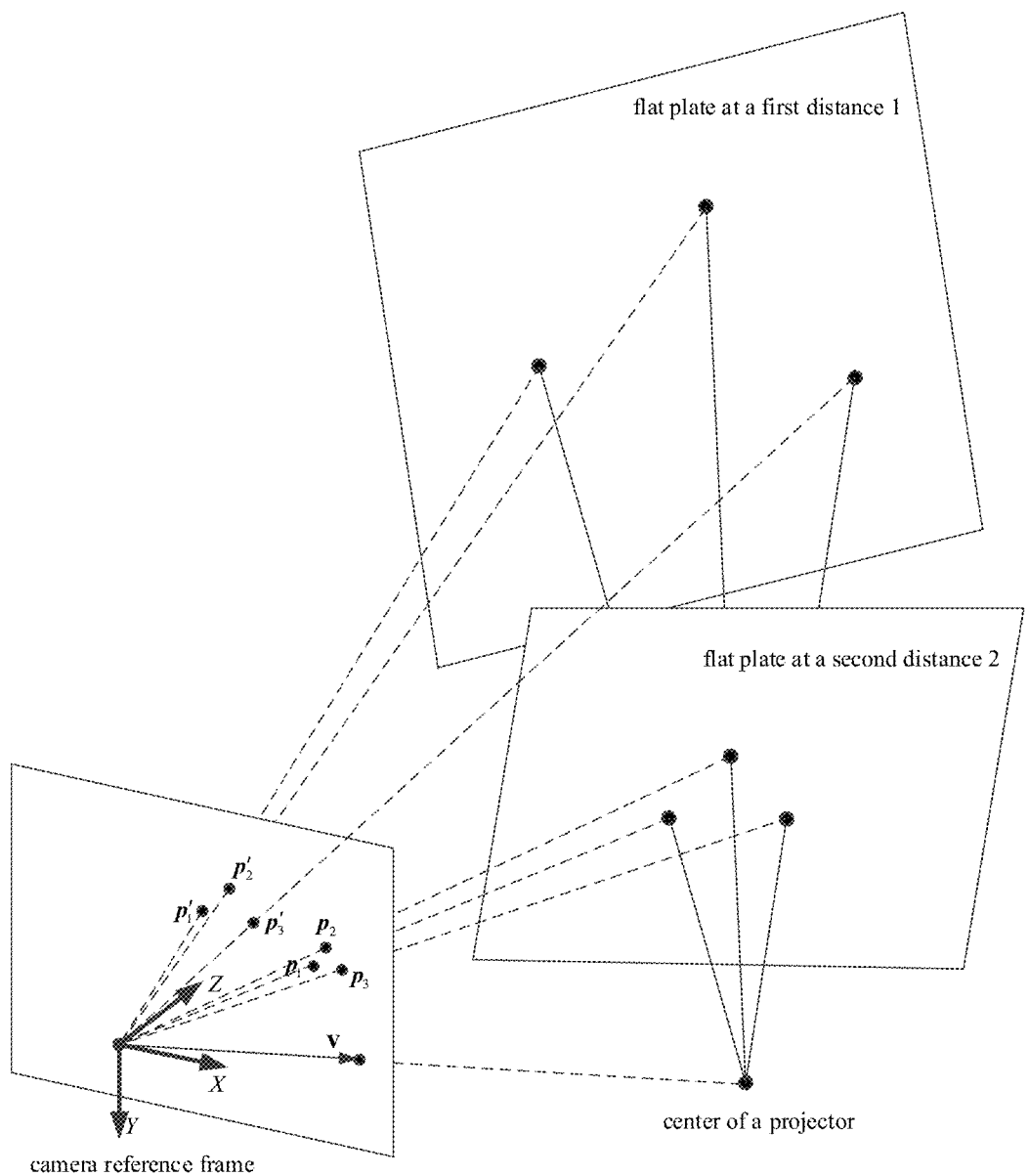
FIG. 3 is a schematic diagram for illustrating a principle of an image correction method for a camera according to embodiments of the present disclosure.

Reference will be made to FIG. 2 and FIG. 3, in which FIG. 2 is a schematic flowchart for illustrating an image correction method for a camera according to embodiments of the present disclosure, and FIG. 3 is a schematic diagram for illustrating a principle of an image correction method for a camera according to embodiments of the present disclosure.

As illustrated in FIG. 2, a same one white flat plate is placed directly in front of the camera and the speckle projector at two different distances therefrom. At each distance, the flat plate is placed in such a way that the flat plate covers the field of view of the camera as much as possible. The speckle pattern is projected onto the flat plate by the speckle projector, and the camera captures two flat plate images with speckles, i.e., the first image 1 and the second image 2.

In some embodiments of the present disclosure, it is also possible to use two white flat plates, which are placed in front of the camera and at different distances from the camera, respectively, so as to obtain the first image 1 and the second image 2.

The first image 1 is sub-pixel matched with the second image 2. For pixel points in the first image 1, their respective sub-pixel matching points in the second image 2 are obtained. The matching method may be a block matching method or other existing matching methods.

Based on the pixel coordinates of each set of matching points, their physical imaging coordinates are computed, and such a process may be achieved by the internal parameter conversion:

$$\begin{bmatrix} u_i \\ v_i \\ 1 \end{bmatrix} = A^{-1} \begin{bmatrix} x_i \\ y_i \\ 1 \end{bmatrix}, \begin{bmatrix} u'_i \\ v'_i \\ 1 \end{bmatrix} = A^{-1} \begin{bmatrix} x'_i \\ y'_i \\ 1 \end{bmatrix}, (i = 1, 2, \ldots, n);$$

where $(x_i, y_i)^T$ represents a pixel coordinate of a pixel point $p_i$ in the first image 1, $(x'_i, y'_i)^T$ represents a pixel coordinate of a pixel point $p'_i$ in the second image 2, which is matched with the pixel point $p_i$, $(u_i, v_i)^T$ represents a first physical coordinate (also known as first physical imaging coordinate) of the pixel point $p_i$, $(u'_i, v'_i)^T$ represents a second physical coordinate (also known as second physical imaging coordinate) of the pixel point Pi; and A represents an internal parameter matrix of the camera.

A mapping matrix H from $(u_i, v_i)^T = 1, 2, \ldots, n)$ to $(u'_i, v'_i)^T, = 1, 2, \ldots, n)$ is computed.

In some embodiments of the present disclosure, H may be a 3×3 homograph matrix. Based on a projective geometry related theory, H may be expressed as:

$$H = I + (\mu - 1) \frac{va^T}{v^T a};$$

where I represents a 3×3 unit matrix, $\mu$ represents a scalar, v and a are each a homogeneous representation of a two-dimensional vector, in which v represents a homogeneous coordinate of a projecting position of the center of the speckle projector on the camera, and at the same time also represents the direction vector of the center of the speckle projector in the camera reference frame. Therefore, H may be expressed by five independent parameters.

The computation of H may be achieved by iterative optimization, and an optimized target function may be expressed as:

$$E = \sum_{i=1}^{n} (u'_i - \hat{u}'_i)^2 + (v'_i - \hat{v}'_i)^2;$$

where $$\begin{bmatrix} \hat{u}'_i \\ \hat{v}'_i \\ 1 \end{bmatrix} = H \begin{bmatrix} u_i \\ v_i \\ 1 \end{bmatrix}, (i = 1, 2, \ldots, n);$$

from the mapping matrix H, the direction vector v of the center of the speckle projector in the camera reference frame is obtained.

That is, when H is obtained from the above computations, the vector v can be obtained accordingly. The vector v is the direction vector of the center of the projector in the camera reference frame.

Coordinate axis directions of the camera reference frame are adjusted to align an X-axis with the direction vector v, and then an imaging matrix of the camera is updated.

In some embodiments of the present disclosure, the imaging matrix of the camera before correction may be expressed as:

$$P = A[R|t];$$

where A represents the internal parameter matrix of the camera, t represents a translation vector of the camera, and R represents a rotation matrix of the camera before correction, and is expressed as:

$$R = \begin{bmatrix} r_1^T \\ r_2^T \\ r_3^T \end{bmatrix} = \begin{bmatrix} 1 & 0 & 0 \\ 0 & 1 & 0 \\ 0 & 0 & 1 \end{bmatrix}.$$

Assumed that a rotation matrix of the camera after correction is:

$$\overline{R} = \begin{bmatrix} \overline{r}_1^T \\ \overline{r}_2^T \\ \overline{r}_3^T \end{bmatrix};$$

where $\overline{r}_1$ represents a direction vector of the X-axis of the camera reference frame after correction, which is computed by $\overline{r}_1 = v/\|v\|$; $\overline{r}_2$ represents a direction vector of a Y-axis of the camera reference frame after correction, which is computed by $\overline{r}_2 = (r_3 \times \overline{r}_1)/\|r_3 \times \overline{r}_1\|$, and $\overline{r}_3$ represents a direction vector of a Z-axis of the camera reference frame after correction, which is computed by $\overline{r}_3 = \overline{r}_1 \times \overline{r}_2$.

The internal parameter matrix A and the translation vector t remain unchanged before and after correction. Therefore, an imaging matrix of the camera after correction may be obtained as:

$$\overline{P} = A[\overline{R}|t].$$

Based on the corrected imaging matrix, the original scene image is mapped to obtained a new image, i.e., a corrected image. A transformation matrix T is obtained according to the following formula, and pixel coordinates in the original scene image are mapped onto the corrected image through the transformation matrix T:

$$T = (A\overline{R})(AR)^{-1}.$$

Specifically, the corrected image is generated as follows. For each pixel position $(\overline{x}, \overline{y})^T$ in the corrected image, its respective pixel position $(x, y)^T$ in the original image is computed by the transformation matrix T. As such a respective pixel position is generally not integral, a grayscale at the position $(x, y)^T$ is computed by gray interpolation, and then is assigned to the pixel position $(\overline{x}, \overline{y})^T$ in the corrected image. These above operations are executed for each pixel to obtain the entire corrected image. This image is equivalent to an image captured in the case where the camera and speckle projector are in the ideal positions, i.e., an image captured in the case where a straight line connecting an optical center of the camera with the center of the speckle projector is parallel to the X-axis of the camera reference system.

Figure 4:
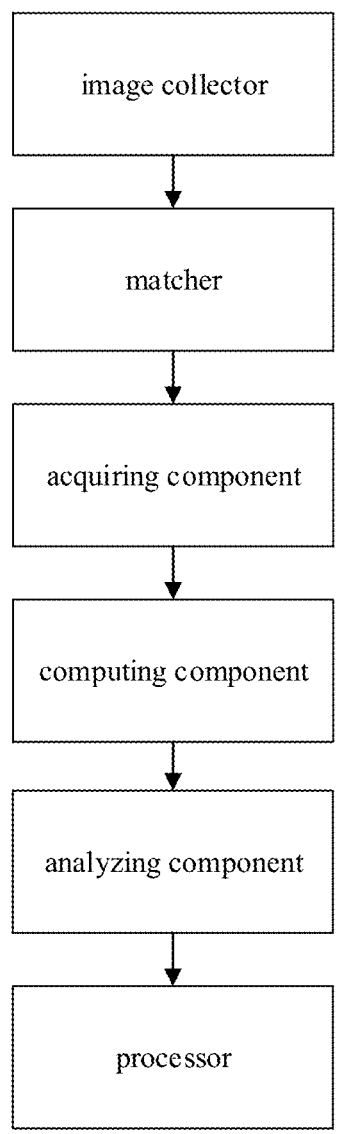
FIG. 4 is a block diagram of an image correction apparatus according to embodiments of the present disclosure.

As illustrated in FIG. 4, the present disclosure also provides in embodiments an image correction apparatus for a camera. The apparatus includes an image collector, a matcher, an acquiring component, a computing component, an analyzing component, and a processor.

The image collector is configured to capture speckle patterns on two planes at different distances to obtain a first image of speckle projected on a first plane and a second image of speckle projected on a second plane. The speckle patterns are projected by a speckle projector, and the image collector and the speckle projector have the same orientation and fixed relative positions.

The matcher is configured to match the first image with the second image by an image matching algorithm to obtain sub-pixel matching points.

The acquiring component is configured to obtain, based on first physical coordinates of the sub-pixel matching points on the first image and second physical coordinates of the sub-pixel matching points on the second image, a mapping matrix between the first physical coordinates and the second physical coordinates.

The computing component is configured to obtain a direction vector of a center of the speckle projector in a camera reference frame according to the mapping matrix.

The analyzing component is configured to adjust coordinate axis directions of the camera reference frame to align a horizontal axis direction with the direction vector, and update an imaging matrix of the image collector.

The processor is configured to map a target scene image through the imaging matrix to obtain a corrected image.

In some embodiments of the present disclosure, the acquiring component is further configured to: perform computations based on pixel coordinates of the sub-pixel matching points by internal parameter conversion to obtain the first physical coordinates of the sub-pixel matching points on the first image and the second physical coordinates of the sub-pixel matching points on the second image.

In some embodiments of the present disclosure, the acquiring component is configured to: compute the mapping matrix between the first physical coordinates on the first image and the second physical coordinates on the second image through projective geometry. For example, the mapping matrix may be computed according to the following formula:

$$\begin{bmatrix} u'_i \\ v'_i \\ 1 \end{bmatrix} = H \begin{bmatrix} u_i \\ v_i \\ 1 \end{bmatrix}, (i = 1, 2, \ldots, n);$$

where $(u_i, v_i)^T$ represents the first physical coordinates, and $(u'_i, v'_i)^T$ represents the second physical coordinates.

Further, the mapping matrix may be expressed as:

$$H = I + (\mu - 1) \frac{va^T}{v^T a};$$

where H represents the mapping matrix, μ represents a scalar, v represents a homogeneous coordinate of a projecting position of the center of the speckle projector on the image collector and the direction vector of the center of the speckle projector in the camera reference frame; and a is a homogeneous representation of another two-dimensional vector.

In some embodiments of the present disclosure, the processor is configured to compute grayscales of sub-pixel points on the target scene image by interpolation, and assign the grayscales to respective pixel points on the corrected image.

The present disclosure also provides in embodiments an electronic device. The electronic device includes a memory; a processor; and computer programs stored in the memory and executable by the processor. The computer programs that, when executed by the processor, cause the image correction method as described in the above embodiments to be performed.

The present disclosure also provides in embodiments a computer-readable storage medium having stored therein computer programs that execute the image correction method as described in the above embodiments.

The beneficial technical effects achieved by embodiments of the present disclosure are that the higher calibration accuracy is achieved with a simpler structure, lower costs and lower power consumption, which provides better data support for image recognition and other technologies.

Figure 5:
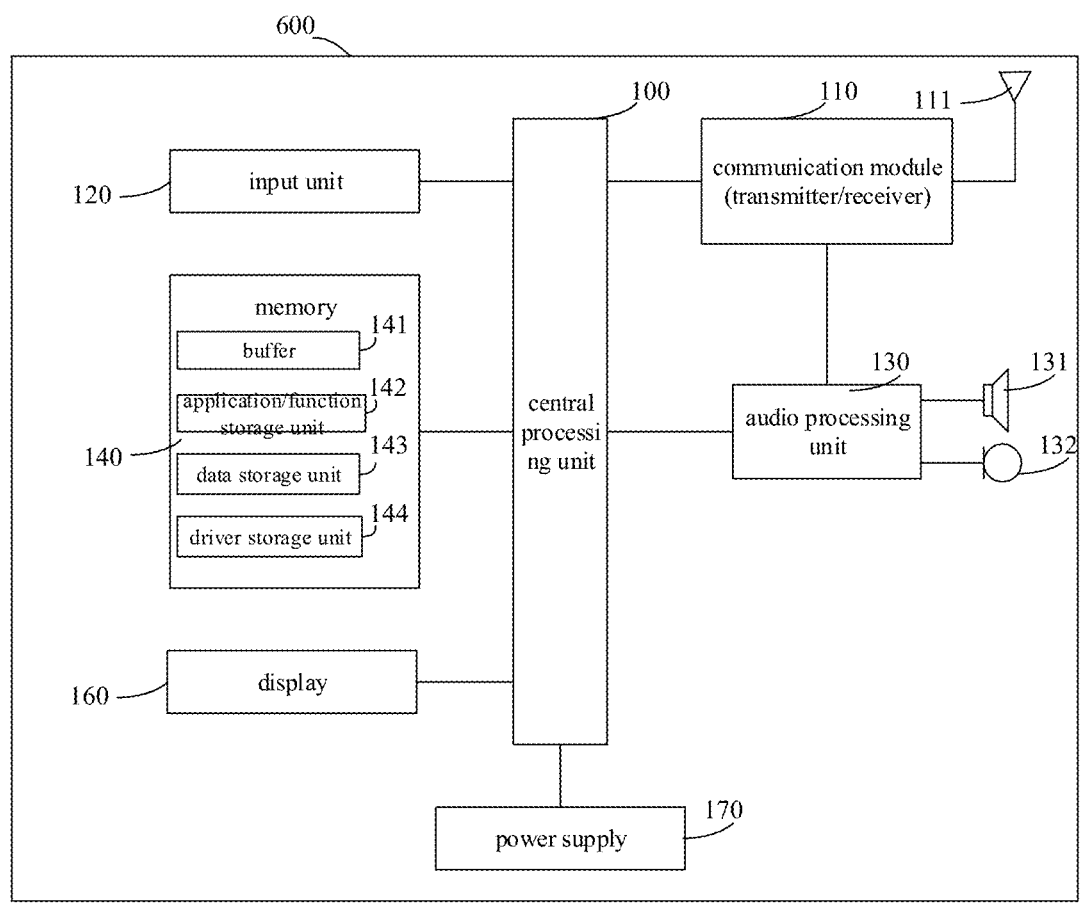
FIG. 5 is a block diagram of an electronic device according to embodiments of the present disclosure.

As illustrated in FIG. 5, the electronic device 600 further includes a central processing unit 100, a communication module 110, an input unit 120, an audio processing unit 130, a memory 140, a display 160, and a power supply 170. It is to be noted that the electronic device 600 does not necessarily include all the components shown in FIG. 5. In addition, the electronic device 600 may also include components not shown in FIG. 5, for which reference may be made to the prior art.

As illustrated in FIG. 5, the central processing unit 100 is sometimes also called a controller or an operation controlling component, which may include a microprocessor or other processor devices and/or logic devices. The central processing unit 100 receives inputs and controls operations of various components of the electronic equipment 600.

Among them, the memory 140 may be, for example, one or more of a buffer, a flash memory, a hard drive, a removable medium, a volatile memory, a non-volatile memory, or other suitable devices, which may store the above-mentioned failure-related information and the program for executing the related information. The program stored in the memory 140 is executable by the central processing unit 100 to realize information storage or processing.

The input unit 120 provides inputs to the central processing unit 100. The input unit 120 may be, for example, a button or a touch input device. The power supply 170 is configured to provide power to the electronic device 600. The display 160 is configured to display objects such as images and texts. The display may be, for example, a liquid crystal display (LCD) display, but s not limited thereto.

The memory 140 may be a solid-state memory, for example, a read-only memory (ROM), a random access memory (RAM), a subscriber identification module (SIM) card, etc. The memory 140 may also be such a memory that saves information even when the power is off, can be selectively erased and is provided with more data, and an example of this memory is sometimes referred to as electrically erasable programmable read-only memory (EEPROM) or the like. The memory 140 may also be in some other types. The memory 140 includes a buffer memory 141 (sometimes referred to as a buffer). The memory 140 may include an application/function storage unit 142, which is configured to store application programs and function programs or to execute the operation flow of the electronic device 600 through the central processing unit 100.

The memory 140 may further include a data storage unit 143, which is configured to store data, such as contact data, digital data, pictures, sounds, and/or any other data used by the electronic device. A driver storage unit 144 of the memory 140 may include various driver programs for the communication function of the electronic device and/or for executing other functions of the electronic device (such as a messaging application, an address book application, etc.).

The communication module 110 is a transmitter/receiver 110 that transmits and receives signals via an antenna 111. The communication module (i.e., the transmitter/receiver) 110 is coupled to the central processing unit 100 to provide input signals and receive output signals, which may be the same as that of a conventional mobile communication terminal.

Based on different communication technologies, the same one electronic device may be provided with multiple communication modules 110, such as a cellular network module, a Bluetooth module, and/or a wireless local area network module. The communication module (i.e., the transmitter/receiver) 110 is also coupled to a speaker 131 and a microphone 132 via the audio processing unit 130 to provide audio output via the speaker 131 and receive audio input from the microphone 132, thereby realizing the general telecommunication functions. The processing unit 130 may include any suitable buffers, decoders, amplifiers, etc. In addition, the audio processing unit 130 is also coupled to the central processing unit 100, so as to record sounds in the local machine via the microphone 132 and play sounds stored in the local machine via the speaker 131.

It is to be understood to those skilled in the art that the embodiments of the present disclosure can be provided as a method, a system, or a computer program product. Therefore, the embodiments of the present disclosure may be in forms of a complete hardware embodiment, a complete software embodiment, or an embodiment combining software and hardware. Moreover, the present disclosure may adopt the form of a computer program product, which is implemented on one or more computer-usable storage media (including but not limited to a disk storage, a compact disc read-only memory (CD-ROM), an optical memory, etc.) containing computer-usable program codes.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be implemented by computer program instructions. These computer program instructions may be provided to the processor of a general-purpose computer, a special-purpose computer, an embedded processor, or other programmable data processing equipment to generate a machine, so that the instructions executed by the processor of the computer or other programmable data processing equipment generate a device that implements the functions specified in one or more processes in the flowchart and/or one or more blocks in the block diagram.

These computer program instructions may also be stored in a computer-readable memory that can direct the computer or other programmable data processing equipment to work in a specific manner, so that the instructions stored in the computer-readable memory produce a manufactured article including an instruction device, and the instruction device realizes the functions specified in one or more processes in the flowchart and/or one or more blocks in the block diagram.

These computer program instructions may also be loaded on the computer or other programmable data processing equipment, so that a series of operation steps are executed on the computer or other programmable equipment to produce computer-implemented processing, such that the instructions executed on the computer or other programmable equipment provide steps for implementing functions specified in one or more processes in the flowchart and/or one or more blocks in the block diagram.

The specific embodiments described above serve to further illustrate the objects, technical solutions and beneficial effects of the present disclosure in detail. It should be understood that the above descriptions are only some specific embodiments of the present disclosure and are not intended to limit the scope of the present disclosure, and changes, alternatives, equivalent replacements and modifications made within the spirit and principle of the present disclosure shall be included in the protection scope of the present disclosure.

What is claimed is:

1. An image correction method for a camera, comprising:
   capturing speckle patterns on two planes at different distances by the camera to obtain a first image of speckle projected on a first plane and a second image of speckle projected on a second plane, the speckle patterns being projected by a speckle projector, and the camera and the speckle projector having a same orientation and fixed relative positions;
   matching the first image with the second image by an image matching algorithm to obtain sub-pixel matching points;
   obtaining, based on first physical coordinates of the sub-pixel matching points on the first image and second physical coordinates of the sub-pixel matching points on the second image, a mapping matrix between the first physical coordinates and the second physical coordinates;
   obtaining a direction vector of a center of the speckle projector relative to an origin of a camera reference frame according to the mapping matrix;
   adjusting coordinate axis directions of the camera reference frame to align a horizontal axis direction with the direction vector, and updating an imaging matrix of the camera; and
   mapping a target scene image through the imaging matrix to obtain a corrected image.

2. The image correction method according to claim 1, further comprising:
   performing computations based on pixel coordinates of the sub-pixel matching points by internal parameter conversion to obtain the first physical coordinates of the sub-pixel matching points on the first image and the second physical coordinates of the sub-pixel matching points on the second image.

3. The image correction method according to claim 2, wherein the first physical coordinates of the sub-pixel matching points on the first image and the second physical coordinates of the sub-pixel matching points on the second image are obtained by the internal parameter conversion according to a formula:

$$\begin{bmatrix} u_i \\ v_i \\ 1 \end{bmatrix} = A^{-1} \begin{bmatrix} x_i \\ y_i \\ 1 \end{bmatrix} \begin{bmatrix} u_i' \\ v_i' \\ 1 \end{bmatrix} = A^{-1} \begin{bmatrix} x_i' \\ y_i' \\ 1 \end{bmatrix}, (i = 1, 2, \ldots, n);$$

where $(x_i, y_i)^T$ represents a pixel coordinate of a pixel point $p_i$ in the first image, $(x_i', y_i')^T$ represents a pixel coordinate of a pixel point $p_i'$ in the second image, which is matched with the pixel point $p_i$, $(u_i, v_i)^T$ represents the first physical coordinate of the pixel point $p_i$, $(u_i', v_i')^T$ represents the second physical coordinate of the pixel point and A represents an internal parameter matrix of the camera.

4. The image correction method according to claim 1, wherein obtaining, based on first physical coordinates of the sub-pixel matching points on the first image and second physical coordinates of the sub-pixel matching points on the second image, a mapping matrix between the first physical coordinates and the second physical coordinates comprises:
   computing the mapping matrix according to a formula:

$$\begin{bmatrix} u_i' \\ v_i' \\ 1 \end{bmatrix} = H \begin{bmatrix} u_i \\ v_i \\ 1 \end{bmatrix}, (i = 1, 2, \ldots, n);$$

where $(u_i, v_i)^T$ represents the first physical coordinates, and $(u_i', v_i')^T$ represents the second physical coordinates;
wherein the mapping matrix is expressed as:

$$H = I + (\mu - 1)\frac{va^T}{v^T a};$$

where H represents the mapping matrix, I represents a 3×3 unit matrix, μ represents a scalar, v represents a homogeneous coordinate of a projecting position of the center of the speckle projector on the camera and the direction vector of the center of the speckle projector relative to the origin of the camera reference frame; and a is a homogeneous representation of another two-dimensional vector.

5. The image correction method according to claim 1, wherein mapping a target scene image through the imaging matrix to obtain a corrected image comprises:
computing grayscales of sub-pixel points on the target scene image by interpolation, and assigning the grayscales to respective pixel points on the corrected image.

6. An image correction apparatus, comprising:
an image collector, configured to capture speckle patterns on two planes at different distances to obtain a first image of speckle projected on a first plane and a second image of speckle projected on a second plane, the speckle patterns being projected by a speckle projector, and the image collector and the speckle projector having a same orientation and fixed relative positions;
a matcher, configured to match the first image with the second image by an image matching algorithm to obtain sub-pixel matching points;
an acquiring component, configured to obtain, based on first physical coordinates of the sub-pixel matching points on the first image and second physical coordinates of the sub-pixel matching points on the second image, a mapping matrix between the first physical coordinates and the second physical coordinates;
a computing component, configured to obtain a direction vector of a center of the speckle projector relative to an origin of a camera reference frame according to the mapping matrix;
an analyzing component, configured to adjust coordinate axis directions of the camera reference frame to align a horizontal axis direction with the direction vector, and update an imaging matrix of the image collector; and
a processor, configured to map a target scene image through the imaging matrix to obtain a corrected image.

7. The image correction apparatus according to claim 6, wherein the acquiring component is further configured to: perform computations based on pixel coordinates of the sub-pixel matching points by internal parameter conversion to obtain the first physical coordinates of the sub-pixel matching points on the first image and the second physical coordinates of the sub-pixel matching points on the second image.

8. The image correction apparatus according to claim 7, wherein the acquiring component is further configured to obtain the first physical coordinates of the sub-pixel matching points on the first image and the second physical coordinates of the sub-pixel matching points on the second image by the internal parameter conversion according to a formula:

$$\begin{bmatrix} u_i \\ v_i \\ 1 \end{bmatrix} = A^{-1} \begin{bmatrix} x_i \\ y_i \\ 1 \end{bmatrix}, \begin{bmatrix} u_i' \\ v_i' \\ 1 \end{bmatrix} = A^{-1} \begin{bmatrix} x_i' \\ y_i' \\ 1 \end{bmatrix}, (i = 1, 2, \ldots, n);$$

where $(x_i, y_i)^T$ represents a pixel coordinate of a pixel point $p_i$ in the first image, $(x_i', y_i')^T$ represents a pixel coordinate of a pixel point in the second image, which is matched with the pixel point $p_i$, $(u_i, v_i)^T$ represents the first physical coordinate of the pixel point $p_i$, $(u_i', v_i')^T$ represents the second physical coordinate of the pixel point $p_i'$; and A represents an internal parameter matrix of the image collector.

9. The image correction apparatus according to claim 6, wherein the acquiring component is configured to: compute the mapping matrix according to a formula:

$$\begin{bmatrix} u_i' \\ v_i' \\ 1 \end{bmatrix} = H \begin{bmatrix} u_i \\ v_i \\ 1 \end{bmatrix}, (i = 1, 2, \ldots, n);$$

where $(u_i, v_i)^T$ represents the first physical coordinates, and $(u_i', v_i')^T$ represents the second physical coordinates;
wherein the mapping matrix is expressed as:

$$H = I + (\mu - 1)\frac{va^T}{v^T a};$$

where H represents the mapping matrix, I represents a 3×3 unit matrix, μ represents a scalar, v represents a homogeneous coordinate of a projecting position of the center of the speckle projector on the image collector and the direction vector of the center of the speckle projector relative to the origin of the camera reference frame; and a is a homogeneous representation of another two-dimensional vector.

10. The image correction apparatus according to claim 6, wherein the processor is configured to compute grayscales of sub-pixel points on the target scene image by interpolation, and assign the grayscales to respective pixel points on the corrected image.

11. A non-transitory computer-readable storage medium having stored therein computer programs that execute an image correction method, comprising:
capturing speckle patterns on two planes at different distances by a camera to obtain a first image of speckle projected on a first plane and a second image of speckle projected on a second plane, the speckle patterns being projected by a speckle projector, and the camera and the speckle projector having a same orientation and fixed relative positions;
matching the first image with the second image by an image matching algorithm to obtain sub-pixel matching points;
obtaining, based on first physical coordinates of the sub-pixel matching points on the first image and second physical coordinates of the sub-pixel matching points on the second image, a mapping matrix between the first physical coordinates and the second physical coordinates;

obtaining a direction vector of a center of the speckle projector relative to an origin of a camera reference frame according to the mapping matrix;

adjusting coordinate axis directions of the camera reference frame to align a horizontal axis direction with the direction vector, and updating an imaging matrix of the camera; and mapping a target scene image through the imaging matrix to obtain a corrected image.

12. The non-transitory computer-readable storage medium according to claim 11, wherein the method further comprises:

performing computations based on pixel coordinates of the sub-pixel matching points by internal parameter conversion to obtain the first physical coordinates of the sub-pixel matching points on the first image and the second physical coordinates of the sub-pixel matching points on the second image.

13. The non-transitory computer-readable storage medium according to claim 12, wherein the first physical coordinates of the sub-pixel matching points on the first image and the second physical coordinates of the sub-pixel matching points on the second image are obtained by the internal parameter conversion according to a formula:

$$\begin{bmatrix} u_i \\ v_i \\ 1 \end{bmatrix} = A^{-1} \begin{bmatrix} x_i \\ y_i \\ 1 \end{bmatrix}, \begin{bmatrix} u_i' \\ v_i' \\ 1 \end{bmatrix} = A^{-1} \begin{bmatrix} x_i' \\ y_i' \\ 1 \end{bmatrix}, (i=1, 2, \ldots, n);$$

where $(x_i, y_i)^T$ represents a pixel coordinate of a pixel point $p_i$ in the first image, $(x_i', y_i')^T$ represents a pixel coordinate of a pixel point $p_i'$ in the second image, which is matched with the pixel point $p_i$, $(u_i, v_i)^T$ represents the first physical coordinate of the pixel point $p_i$ $(u_i', v_i')^T$ represents the second physical coordinate of the pixel point $p_i'$; and A represents an internal parameter matrix of the camera.

14. The non-transitory computer-readable storage medium according to claim 11, wherein obtaining, based on first physical coordinates of the sub-pixel matching points on the first image and second physical coordinates of the sub-pixel matching points on the second image, a mapping matrix between the first physical coordinates and the second physical coordinates comprises:

computing the mapping matrix according to a formula:

$$\begin{bmatrix} u_i' \\ v_i' \\ 1 \end{bmatrix} = H \begin{bmatrix} u_i \\ v_i \\ 1 \end{bmatrix}, (i=1, 2, \ldots, n);$$

where $(u_i, v_i)^T$ represents the first physical coordinates, and $(u_i', v_i')^T$ represents the second physical coordinates;

wherein the mapping matrix is expressed as:

$$H = I + (\mu - 1)\frac{va^T}{v^T a};$$

where H represents the mapping matrix, I represents a 3×3 unit matrix, μ represents a scalar, v represents a homogeneous coordinate of a projecting position of the center of the speckle projector on the camera and the direction vector of the center of the speckle projector relative to the origin of the camera reference frame; and a is a homogeneous representation of another two-dimensional vector.

15. The non-transitory computer-readable storage medium according to claim 11, wherein mapping a target scene image through the imaging matrix to obtain a corrected image comprises:

computing grayscales of sub-pixel points on the target scene image by interpolation, and assigning the grayscales to respective pixel points on the corrected image.

* * * * *